E. J. PACE.
RECTIFIER.
APPLICATION FILED JULY 21, 1915.
1,217,877.
Patented Feb. 27, 1917.
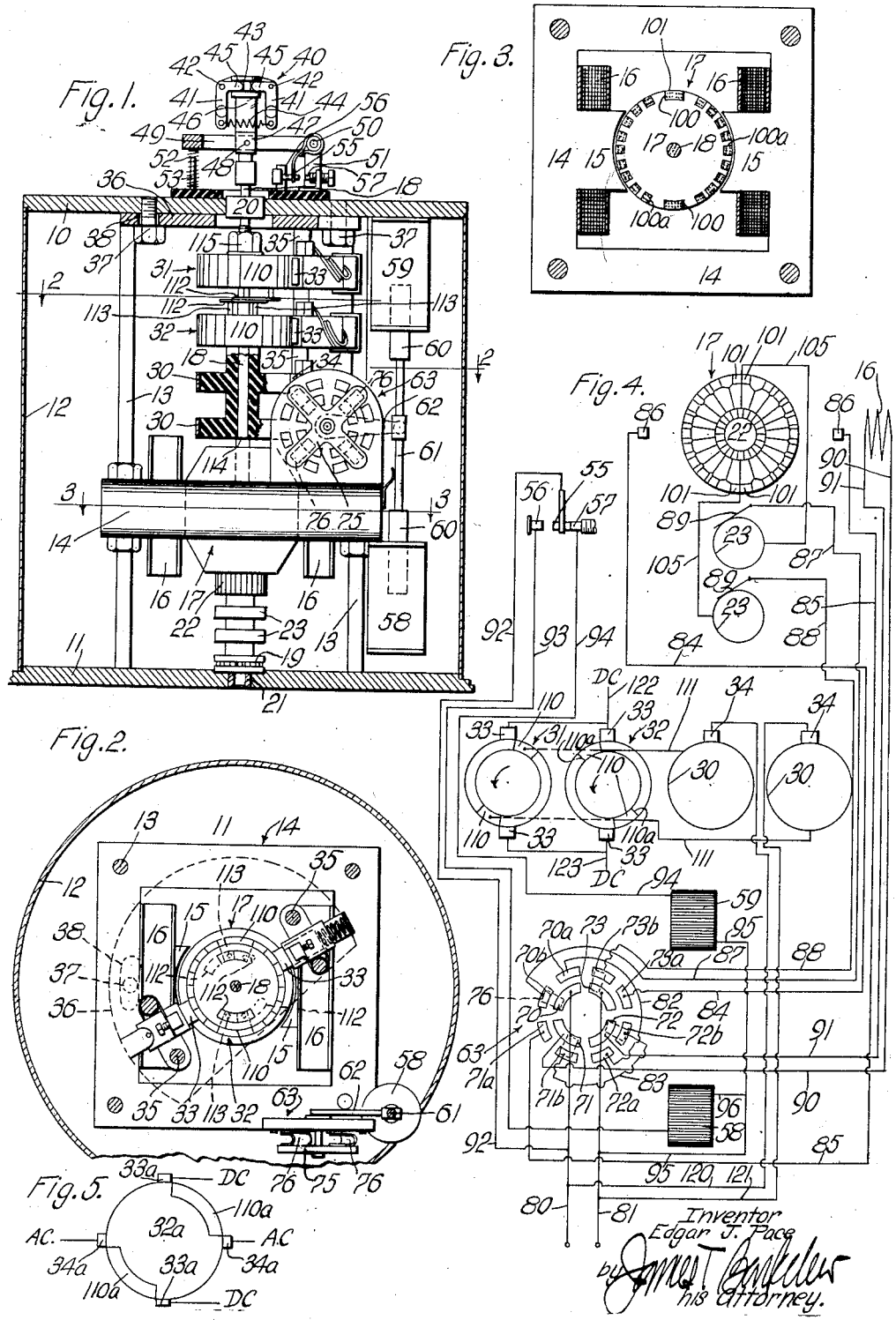
Inventor
Edgar J. Pace
by James T. Bankeler
his Attorney.

UNITED STATES PATENT OFFICE.

EDGAR J. PACE, OF LOS ANGELES, CALIFORNIA.

RECTIFIER.

1,217,877. Specification of Letters Patent. Patented Feb. 27, 1917.

Application filed July 21, 1915. Serial No. 41,099.

*To all whom it may concern:*

Be it known that I, EDGAR J. PACE, a citizen of the United States, residing at Los Angeles, in the county of Los Angeles, State of California, have invented new and useful Improvements in Rectifiers, of which the following is a specification.

This invention relates to rectifiers adapted to rectify alternating current, such as the single phase alternating current extensively used for lighting and other purposes; and it is a primary object of this invention to provide a simple and effective means for rectifying such current at high efficiency and with great reliability, and for providing means for obtaining direct current of various voltages.

Among other objects of this invention, the following may be mentioned: to provide a motor adapted particularly for driving a rectifier mechanism of the character herein set forth; to provide in a single motor mechanism a means for starting the rectifier mechanism and for bringing it up to a speed of synchronism and to then provide means for operating the motor as a synchronous motor; to provide an arrangement in such a motor so that there is a very strong tendency for the motor to run in true and exact synchronism with little or no liability of the motor losing step. These objects, and others of various natures, will appear from the following specification.

A preferred form of mechanism embodying this invention, and accomplishing these objects, is illustrated in the accompanying drawings, in which—

Figure 1 is a vertical section of a mechanism embodying this invention, Fig. 2 is a horizontal section taken as indicated by line 2—2 on Fig. 1, Fig. 3 is a horizontal section taken as indicated by line 3—3 on Fig. 1, Fig. 4 is a diagram showing the electrical connections of the complete device, and Fig. 5 is a diagram showing a modification of the rectifier mechanism, to be hereinafter explained.

In the preferred form, the mechanical construction of the rectifier includes an upper and a lower base 10 and 11, with a casing 12 protecting the mechanism included between the two bases. Supporting rods or studs 13 may be utilized for connecting and spacing the two bases; and the laminated field magnet 14 may be mounted upon these studs; or may be mounted upon the bases in any desired manner. The field magnet is preferably made in the form shown in the drawings with a plurality of oppositely disposed field poles, preferably two, 15; and preferably a pair of field windings 16. These field windings 16 are each preferably composed of a comparatively few turns of heavy wire. The armature 17 is mounted upon the armature shaft 18 which shaft is mounted in the ball bearings 19 and 20 and in the bushing bearing 21, as illustrated. Below the armature 17 on the shaft 18 the commutator 22 and collector rings 23 are preferably placed; these being the commutator and collector rings which lead current to the armature windings as will hereinafter be described. On the shaft 18 above the armature the rectifier commutators and collector rings are preferably mounted. There is a pair of collector rings 30 and preferably a pair of commutators 31 and 32. Each of the commutators 31 and 32 has a pair of oppositely disposed brushes 33, while each of the collector rings 30 has a single brush 34. All of these brushes are preferably mounted upon vertical studs 35 suspended from a plate 36 (indicated in dotted lines in Fig. 2) said plate being secured to the upper base 10 by suitable bolts or screws 37 as is shown in Fig. 1. The bolts 37 may pass through slots 38 in the plate, so that the plate may be adjusted to adjust the exact position of the brushes 33 and 34; so as to adjust the brushes 33 accurately in proper position with relation to the commutators 31 and 32.

A speed controlled element 40 is mounted upon the upper end of the armature shaft 18. A pair of arms 41 are pivoted at 42 to a cap 43 carried on the shaft, the outward centrifugally impelled movement of the arms being appropriately opposed by the spring 44. Extensions 45 of the arms bear downwardly against a slidable sleeve 46 and the lower end of this slidable sleeve rests upon a collar 47 which is pivotally connected at 48 with a horizontal arm 49 pivoted at 50 to a support 51. The free end of the arm 49 is normally supported by a suitable spring 52, a pin 53 forming a limit stop to the downward movement of the arm 49. The arrangement is such that, when the armature shaft reaches a certain predetermined speed of rotation, the arm 49 is pushed downwardly. When the arm is in its normal position, before the armature shaft reaches said predetermined speed, a contact 55 carried by the arm 49 normally engages a stationary contact 56. When the arm 49 is depressed, when the armature shaft reaches said certain predetermined speed, the contact 59 moves to the right in Fig. 1 and engages a stationary adjustable contact 57. Contact 56 is connected in circuit with a solenoid 58. Contact 57 is connected in circuit with a solenoid 59. These solenoids have armature cores 60 mounted upon a common rod 61 to which rod the operating arm 62 of the switch 63 makes connection. Switch 63 is of peculiar construction and is shown in diagram in Fig. 4. There are four inner contacts 70, 71, 72 and 73 arranged about a common center, and eight outer contacts $70^a$ and $70^b$, $71^a$ and $71^b$, $72^a$ and $72^b$, and $73^a$ and $73^b$, arranged around said common center and arranged in pairs opposite the inner contacts as is clearly shown in Fig. 4. The movable member 75 of the switch carries four spring contacts 76 which bridge across from the respective inner contacts to the corresponding outer contacts; and by movement of the movable member 75 it will be seen that either the outer contacts designated by numerals with the suffix "a" or those designated by numerals with the suffix "b" may be connected with the corresponding inner contacts. In Fig. 1 the parts are shown in their intermediate position, while in Fig. 4 the parts are shown in the position assumed when the motor is running as a synchronous motor. Alternating current is supplied to the two inner contacts 70 and 73 through wires 80 and 81. Outer contact $70^a$ is connected by wire 82 with outer contact $72^a$. Outer contact $72^b$ is connected with outer contact $71^b$ by the wire 83. Outer contacts $73^a$ and $71^a$ are connected by wires 84 and 85, respectively, with the brushes 86 which coöperate with commutator 22. Outer contacts $70^b$ and $73^b$ are connected by wires 87 and 88, respectively, with brushes 89 which coöperate with the collector rings 23 of the armature 17. The inner contacts 71 and 72 are connected by wires 90 and 91 to the field winding 16.

The central movable contact 55 of the switch mechanism which is operated by the speed controlled element 40 is connected by wire 92 with one of the feed wires, as 80. Stationary contact 56 is connected by wire 93 with one side of lower solenoid 58, while stationary contact 57 is connected by wire 94 with one side of upper solenoid 59, the other side of the solenoids being connected by wires 95 and 96 to the other feed wire 81.

The peculiar construction and arrangement of the armature 17 will now be described. The armature 17 may be of any desired type, say of the drum type, and it may have any desired number of slots in its periphery. These slots are circumferentially spaced in the ordinary manner; except that there is a plurality of oppositely disposed slots 100 which are wider than the other slots $100^a$, the slots 100 being wide enough to receive two coils 101, as compared with the slots $100^a$ which receive a coil apiece. Thus, in the preferred form of construction shown in the drawings, in which there are two oppositely disposed wide slots 100, there are two more coils on the armature than there are slots. Thus, for instance, in the preferred design, there are twenty two coils but only twenty slots; eighteen narrow slots and two wide slots. The object of this peculiar construction is to obtain at a certain point on the armature a concentration of winding which will cause a more marked polarity of the armature than is otherwise the case; said marked polarity being of peculiar service when the armature is running in synchronism with the alternating current. In fact, with the construction described, the armature combines the advantages of an armature having a multiplicity of circumferentially spaced coils, together with the advantages of an armature having a single coil winding and of the simple bipolar type. In the construction shown the commutator 22 has twenty two segments which are connected to the armature coils in the ordinary manner; and when the armature is operated by current through the brushes 86 and through the commutator, the armature runs as an ordinary multiple coil drum armature. The two collector rings 23 are connected to the armature coils at the point of concentration of the coils; connecting between the two coils 101 as is shown in Fig. 4. When current is supplied through the wires 87 and 88 to the collector rings 23, then the armature 17 is excited by the alternating current as a bi-polar armature.

In operation, alternating current is supplied to wires 80 and 81. The speed controlled element 40 is in the position shown in Fig. 1 and the contacts 55 and 56 are as shown in Fig. 1 and Fig. 4. Current will pass from wire 80, through wire 92, contact 55, contact 56, wire 93, lower solenoid 58, wire 96, and wire 95 back to the other feed wire 81. The energization of the solenoid 58 will throw the movable part of switch 63 around to such a position that the moving contacts will bridge across and connect the outer contacts designated by the numerals with the suffix "a" with the corresponding inner contacts. Current will then flow through the wire 80 to the inner contact 70 and thence across to the outer contact $70^a$ and thence through wire 82, contact $72^a$, across to the contact 72, and thence through wire 91, field 16, wire 90, contact 71, across to contact $71^a$, and wire 85, brush 86, commutator 22 and the armature windings and brush 86, wire 84, contact 73ª, across to contact 73 and thence to the other feed wire 81. The motor mechanism will then operate as a series motor on alternating current and the speed of the armature will gradually rise until a certain predetermined speed is reached. This predetermined speed is preferably slightly above that required for synchronous running of the armature. When this takes place, the contact 55 moves over and engages the stationary contact 57, when current will be supplied to the upper solenoid 59 through the wire 94. The switch mechanism 63 is then thrown to its other position and circuits are then established as follows: from wire 80 to the inner contact 70 across to contact 70ᵇ, wire 87, brush 89, collector ring 23, the armature winding, collector ring 23, brush 89, wire 88, contact 73ᵇ, across to contact 73, and thence to the other lead wire 81. It will be noted that the field coil 16 is at the same time short circuited upon itself; the two wires 90 and 91 from the field coil leading to the inner contacts 71 and 72, and these contacts being connected together by the two movable contacts 76 which connect the contacts 71 and 72 with the other contacts 71ᵇ and 72ᵇ, respectively, and by the wire 83 which connects the two said outer contacts together. The motor mechanism will then operate as a synchronous motor, the field being inductively energized. The speed of the armature will fall to exact synchronism and the armature will then continue to run in synchronism as long as current is supplied. If the armature does not at first fall into synchronism, its speed of rotation will fall until the speed controlled element 40 moves the contact 55 to again engage the contact 56, when the switch mechanism will be thrown to operate the motor again as a series motor. The speed will again be raised; and the operation will be repeated until the armature falls into exact synchronism.

It will be noted that the motor construction is susceptible of being arranged to produce any part of an armature revolution for each cycle of alternating current supplied. In the form herein shown, the construction is made for a complete revolution for each complete cycle, the field and armature being bi-polar. By arranging a suitable number of poles, the speed of the armature may be made to correspond in any desired manner to the frequency of alternation. In instance, by having four poles instead of two the armature can be made to rotate one half a revolution for each cycle.

In the form of mechanism shown, where the armature makes a whole revolution for each cycle of current, it is preferred to arrange the rectifying mechanism as shown in the various views. The two commutators 31 and 32 have oppositely disposed segments 110, which segments are connected to the two collector rings 30. The segments 110 of the commutator 32 may be connected to the collector rings in any desired manner, as by conductors which are indicated at 111 in Fig. 4. The two segments 110 of commutator 31 are connected to the corresponding segments of commutator 32 by some means allowing relative rotary adjustment of the two commutators. For instance, on each of the commutators there are two plates 112 which are electrically connected to the two segments 110, as by supporting studs 113. The commutators and collector rings may be all loosely mounted upon the armature shaft and held tightly between a suitable shoulder 114 and a notch 115. The two commutators may be relatively adjusted, and both commutators may be adjusted to any desired position upon the shaft. For instance, the two commutators may be so adjusted that when the segment 110 on one of the commutators is just leaving the brush 33, the corresponding segment 110 on the other commutator is just engaging its corresponding brush 33. This is the condition of adjustment in which there is the longest period of engagement of the connected pairs of commutator segments with corresponding brushes; and the parts are so designed that the shaft 18 rotates through an arc of one hundred eighty degrees during this maximum period. For the minimum adjustment, the commutator segments are placed directly opposite each other. The brushes on the same side of the two commutators are connected together by a suitable conductor as shown in Fig. 4.

When the motor shaft is running in synchronism alternating current which is supplied to the collector rings through the wires 120 and 121, is led to the commutator segments 110 and thence through the brushes 33 to the lead wires 122 and 123, from which wires direct current is obtainable. By adjusting the positions of the commutators upon the motor shaft and by adjusting the positions of the brushes on the commutators, two things may be effected. By adjusting the position of the forward edge 110ª of the segment 110 which are ahead (in the direction of rotation) the point or phase on the alternating cycle at which current begins to flow through to the corresponding brushes 33 can be adjusted and fixed. This point may be the zero point or any other point on the cycle. The duration of the period during which current flows into the brushes 33, and thence to the direct current leads, is adjusted and fixed by adjusting the total or aggregate length of the pairs of segments 110. Thus, by proper adjustment in the manner indicated, the voltage of the direct current may be varied. For instance, the commutators may be set to take off current when the alternating current is at its point of highest voltage; on the other hand, the commutators may be set to take off current when the alternating current is at its lowest point of voltage.

In Fig. 5 there is shown a simple form of rectifying commutator adapted for use when the motor makes a half revolution for each cycle (when a four pole motor is used). The commutator 32ª has a pair of oppositely disposed segments 110ª of such circumferential length as to engage the brushes 33ª and 34ª during a quarter revolution. Brushes 34ª are connected to the alternating current leads 80ª and 81ª while brushes 33ª are connected to the direct current leads 122ª and 123ª.

Having described a preferred form of my invention, I claim:

1. In a motor of the character described, a field magnet having a plurality of oppositely disposed poles, an armature having a plurality of circumferentially spaced coils, certain of said coils being concentrated at oppositely disposed points on the armature, a commutator with its segments connected to said coils in progression around the armature, and a pair of collector rings connected to said coils at said oppositely disposed points of concentration.

2. In a device of the character described, a motor embodying a field magnet having a plurality of oppositely disposed poles, an armature having a plurality of circumferentially spaced coils, certain of said coils being concentrated at oppositely disposed points on the armature, a commutator with its segments connected to said coils in progression around the armature, and a pair of collector rings connected to said coils at said oppositely disposed points of concentration, winding for the field magnet, and means for establishing either a circuit in which the motor operates as a series wound motor with it commutator in circuit or a circuit in which the collector rings are in circuit.

3. In a device of the character described, a motor embodying a field magnet having a plurality of oppositely disposed poles, an armature having a plurality of circumferentially spaced coils, certain of said coils being concentrated at oppositely disposed points on the armature, a commutator with its segments connected to said coils in progression around the armature, and a pair of collector rings connected to said coils at said oppositely disposed points of concentration, winding for the field magnet, and means for establishing either a circuit in which the motor operates as a series wound motor with its commutator in circuit or circuits in which the field winding is short circuited upon itself and the collector rings are in circuit.

4. In a device of the character described, a motor embodying a field magnet having a plurality of oppositely disposed poles, an armature having a plurality of circumferentially spaced coils, certain of said coils being concentrated at oppositely disposed points on the armature, a commutator with its segments connected to said coils in progression around the armature, and a pair of collector rings connected to said coils at said oppositely disposed points of concentration, winding for the field magnet, and mechanism for establishing either a circuit in which the motor operates as a series wound motor with its commutator in circuit or circuits in which the motor operates as an induction motor with the field winding short circuited upon itself and the collector rings in circuit, said mechanism including a speed controlled element operated by the armature.

5. In a device of the character described, a motor embodying a field magnet having a plurality of oppositely disposed poles, an armature having a plurality of circumferentially spaced coils, certain of said coils being concentrated at oppositely disposed points on the armature, a commutator with its segments connected to said coils in progression around the armature, and a pair of collector rings connected to said coils at said oppositely disposed points of concentration, winding for the field magnet, and mechanism for establishing either a circuit in which the motor operates as a series wound motor with its commutator in circuit or circuits in which the motor operates as an induction motor with the field winding short circuited upon itself, and the collector rings in circuit, said mechanism including a speed controlled element operated by the armature and operating to establish the first mentioned circuit when the armature rotation is below a certain pre-determined speed and operating to establish the second mentioned circuits when the armature rotation exceeds a certain predetermined speed.

6. In a motor of the character described, an armature embodying a core, a plurality of circumferentially spaced coils thereon, certain of said coils being concentrated at oppositely disposed points on the core, a commutator with its segments connected to the coils around the core, and collector rings connected to said coils at oppositely disposed points.

7. In a device of the character described, a field magnet having a plurality of oppositely disposed poles, an armature having a plurality of circumferentially spaced coils, certain of said coils being concentrated at oppositely disposed points on the armature, said points of concentration corresponding in number and relative disposition to the number and relative disposition of the field magnet poles, a commutator with its segments connected to the coils around the armature, collector rings connected to said coils at oppositely disposed points, and means for establishing either a circuit in which the armature and its commutator are included or a circuit in which the armature and its collector rings are included.

8. In a device of the character described, a field magnet having a plurality of oppositely disposed poles, an armature having a plurality of circumferentially spaced coils, certain of said coils being concentrated at oppositely disposed points on the armature, said points of concentration corresponding in number and relative disposition to the number and relative disposition of the field magnet poles, a commutator with its segments connected to the coils around the armature, collector rings connected to said coils at oppositely disposed points, and means controlled by the speed of rotation of the armature for establishing either a circuit in which the armature and its commutator are included or a circuit in which the armature and its collector rings are included.

In witness that I claim the foregoing I have hereunto subscribed my name this 16th day of July, 1915.

EDGAR J. PACE.

Witness:
ELWOOD H. BARKELEW.